United States Patent Office 3,759,754
Patented Sept. 18, 1973

3,759,754
STEEL WIRE FOR REINFORCING GLASS AND METHOD OF PRODUCTION
Kentaro Nagano and Yoshihito Saoyama, Yokohama, Japan, assignors to Asahi Glass Co., Ltd., Tokyo, Japan
No Drawing. Original application May 28, 1968, Ser. No. 732,530, now abandoned. Divided and this application July 21, 1971, Ser. No. 164,817
Claims priority, application Japan, Mar. 1, 1968, 43/12,887
Int. Cl. C23f 7/10
U.S. Cl. 148—6.16      4 Claims

ABSTRACT OF THE DISCLOSURE

Steel wire-reinforced glass free from bubbles and cracks around the wire reinforcement embedded in the glass is produced with steel wire heated in a water vapor-containing reducing atmosphere, the dew point of which is at least 20° C., before it is embedded in the glass. The reducing atmosphere should contain at least 5 percent by volume of hydrogen gas. Preferably, this steaming treatment is combined with phosphating, chromium-treating and wire-stretching operations.

---

This is a division of copending application Ser. No. 732,530, filed May 28, 1968 now abandoned.

The present invention relates to improved steel wires useful for reinforcing glass, to glass so reinforced, and to methods of producing the steel wires and the reinforced glass.

Steel wire-reinforced glass products, including plate glass reinforced with a steel wire-mesh screen, are manufactured by sealing the steel wire component in a molten glass component. In the course of the sealing operation, bubbles may form in the vicinity of the wire component, and cracks sometimes occur in the glass around the wire, as the reinforced glass is allowed to cool. The air bubbles and cracks so formed tend to reduce the strength of the reinforced glass and/or detract from the saleability of the product.

It is one object of the invention to provide reinforced glass which is free from bubbles and cracks in the vicinity of the steel wire reinforcement sealed into the glass.

It is another object of the invention to provide a steel wire for use in the production of such glass.

The above and other objects are accomplished in accordance with the present invention by using for the glass reinforcement a steel wire wherein the steel contains, by weight, about 0.05 to about 0.2% carbon, less than about 0.035% phosphorus, less than about 0.04% sulfur, less than about 0.8% manganese, less than about 0.3% copper, and about 0.03 to about 0.4% silicon, said steel wire carrying a decarburized surface layer preferably carrying an iron phosphate film which, to prevent rusting, may then be chromium treated. Such a steel wire, preferably in the form of a netting, is sealed into a body of molten glass, which thereupon is cooled to obtain a reinforced glass.

The surface of otherwise conventional steel wire is decarburized by heat-treating the steel wire in a water vapor containing reducing atmosphere until the carbon content of the steel on the surface of the wire has been substantially reduced, the heat-treated wire preferably being stretched and subsequently phosphated until the iron phosphate film has been formed on its surface, which may then be chromium-treated.

Steel wire for use as a reinforcement for glass generally ranges from about 0.4 to about 1 millimeter in diameter. Such wires are manufactured from rods ranging from about 5 to about 10 millimeters in diameter, which are successively guided through a series of dies and are thereby gradually reduced in diameter. This stretching operation is repeated, usually 10 to 25 times, until a steel wire with a proper diameter for glass reinforcement is obtained. In the most preferred embodiment, the steam treatment of this invention is carried out prior to at least the last cycle of the stretching operation. Subsequent to the steam treatment, the stretching operaion is completed, and a phosphating process, which will also hereinafter be described, is carried out. It has been found that by making use of a steel wire which has undergone such treatments, there can be obtained a steel wire-reinforced glass which is entirely free from bubbles and cracks.

In accordance with the invention, a steel wire containing about 0.05 to 0.2 percent by weights of carbon is employed. This grade of wire is commercially available at low cost. Steel contains such minor impurities as P, S, Mn, Cu and Si, in addition of Fe and C. Among those impurities, P and S are derived from the iron ore used, while Cu may be traced back to the scrap used as a raw material for making the steel. Mn and Si are added in the course of steel-making, Mn serving for both desulfurization and deoxidation, and Si for deoxidation.

In the steel wire to be employed for puropses of the invention, the above-mentioned impurities must occur in the following proportions: P<0.035%, S<0.04%, $$Mn<0.8\%,$$

Cu<0.3%, and 0.03–0.4% Si.

The composition of the steel is limited for the following reasons. When carbon occurs in excess of 0.2 percent, the steam treatment of the invention is unduly prolonged and there is also an increased tendency toward the formation of bubbles. The wire-stretching operation is also rendered difficult. On the other hand, when the carbon content is less than 0.05 percent, the steel is liable to be damaged or cut in various operations, such as netting. The rod will be so brittle that it can hardly be stretched if it contains P or/and S in excess of the above-mentioned ranges. It is preferable that P and S occur in as small amounts as possible.

If Mn occurs in excess of 0.8 percent, the stretching of the rod will become difficult. Moreover, since this also increases the yield point of the steel, the above-mentioned tendency toward cracking is promoted. Mn is added to molten steel for deoxidation and desulfurization purposes, and in order that the sulfur content of steel may be restricted to 0.04 percent or less, it is the general practice to incorporate about 0.3 to 0.5 percent of Mn in the steel. It is understood, however, that Mn need not be added if the steel is derived from a sulfur-free material and, therefore, need not be desulfurized.

As the Si content of steel increases beyond 0.4 percent, the steel increases in hardness until it becomes hardly stretchable. The yield point of the steel is also increased, with the result that cracks are liable to form. As explained above, Si is used as a deoxidizing agent. When Si occurs in amounts less than 0.03 percent, no satisfactory deoxidation effect can be expected. Thus, the steel will lose much of its strength and the residual oxides in the steel contribute to the formation of bubbles earlier mentioned.

Both the ductility and malleability of steel are reduced to the extent that the stretching of wire will become difficult, if Cu occurs in excess of 0.3 percent.

As has hereinbefore been pointed out, when conventional wire is sealed into glass, there arise bubbles and cracks around the wire. Our studies led to the following findings.

In addition to such causes as scale and other defects in the steel, it is presumed that bubbles occur largely because the carbon contained in the steel reacts with molten glass to liberate CO and $CO_2$.

Unexpectedly, we found that the formation of bubbles can be completely inhibited by heat-treating the steel wire in a hydrogen gas atmosphere or a mixed hydrogen-nitrogen gaseous atmosphere, which contains a predetermined amount of water vapor (hereinafter referred to as steaming). Such a reducing atmosphere preferably contains at least 5 percent by volume of $H_2$. Prevention of bubbling will not be complete if the amount of $H_2$ is less than 5 percent.

Mixed $H_2$ and $N_2$ gases may be obtained, for example, upon decomposition of ammonia.

There is no limitation as to the manner in which water vapor is incorporated in the reducing atmosphere. For example, the reducing atmosphere may be bubbled into water so that a suitable amount of water vapor may be incorporated in the atmosphere.

Alternatively, water vapor may be directly blown into the reducing atmosphere.

It is also possible to attain a water-vapor-containing reducing atmosphere by the steps of blowing a suitable amount of oxygen into a hydrogen-containing reducing atmosphere, and allowing the hydrogen to burn.

It has been found that good results are attained when the water vapor content of the atmosphere is such that the dew point of the latter is over 20° C. and, preferably, above 30° C. Formation of the bubbles cannot be prevented effectively when the reducing atmosphere has a dew point of less than 20° C.

The temperature and duration of the steaming are determined with reference to the composition of the steel wire material and of the reducing atmosphere. Briefly, the higher the temperature of the steaming, the less the duration of steaming required, but temperatures over 720° C. are hard to attain economically.

A satisfactory range for operating on a commercial scale is a temperature range of 600° to 720° C. and a treatment time of 1 to 4 hours. It is not objectionable to continue the steaming for more than 4 hours but such a practice would be economically unwarranted. Such a steaming operation completely prevents formation of bubbles in glass reinforced with steel wires so treated. This is presumably because a decarburized layer containing only a small amount of carbon, or no carbon at all, is formed on the surface of the steel wire.

It should be noticed, however, that the steaming operation alone cannot completely inhibit the formation of cracks.

It has been found that the formation of cracks can be completely prevented by a phosphating process which will hereinafter be described.

We have conducted a series of studies about the possible causes of cracking and have found that those cracks are attributable to the following causes.

When a steel wire is sealed into molten glass and the resulting assembly is allowed to cool, a stress is generated along the interface of the wire and glass, due to the difference between the coefficients of thermal expansion of the two components, and this stress is responsible for the cracks that are formed in glass in the vicinity of the above-mentioned interface.

The above-mentioned stress has two components; stress $\sigma l$ along the longitudinal axis of the steel wire, and stress $\sigma r$ in the radial direction of the wire. The cracks attributable to stress $\sigma l$ can be prevented by the use of a low-yielding steel wire, that is, a wire having a yield point of 17 kg./mm.$^2$ or less. Since a wire having a low yield point is stretched or deformed in the direction of its longitudinal axis, the stress is relieved to the extent that cracking is prevented. The steel wire treated with a water vapor-containing reducing atmosphere in the above manner is free from the cracks attributable to $\sigma l$ when its carbon content is less than 0.15 percent, because the wire has a yield point of less than 17 kg./mm.$^2$.

The cracks due to $\sigma r$ cannot be prevented by the use of a steel wire having a low yield point. This is because, unlike in the case of $\sigma l$, the wire cannot be deformed so as to increase its radius and, accordingly, there can be no relieving of the stress $\sigma r$.

It has been found that the formation of cracks due to $\sigma r$ can be completely inhibited by a phosphating process. This phenomenon can probably be explained by the following mechanism.

In a phosphating process, a thin (of the order of 0.02 to $1\mu$) film of iron phosphate is formed on the surface of the steel. When a steel wire having such a surface film of iron phosphate is sealed into molten glass, the iron phosphate reacts with the glass so that a thin layer of glass containing phosphoric oxide is formed about the wire.

This phosphoric oxide-containing glass is deformed by stress $\sigma r$ so as to prevent occurrence of an excess stress.

When the surface of the steel wire has minor defects, the cracks attributable to $\sigma r$ are formed more readily in the vicinity of the defects. And the steel wire treated with a water vapor-containing reducing atmosphere is so soft that its surface is vulnerable to defects. Defects are likely to occur, too, in the course of the steaming operation. Therefore, phosphating produces an added beneficial effect when applied in conjunction with steaming.

The phosphating process is also effective in the prevention of cracks due to stress $\sigma l$. Thus, the formation of cracks attributable to $\sigma l$ can be successfully prevented by phosphating even when a relatively inexpensive steel wire containing a high proportion of carbon is employed. (A high-carbon steel wire has a high yield point. For example, steel containing 0.2% of carbon has a yield point of 18.5 kg./mm.$^2$ even after steaming and may be vulnerable to cracking due to $\sigma l$, but the formation of such cracks can be completely inhibited by carrying out the phosphating treatment in combination with steaming.)

Phosphating alone will not inhibit the formation of bubbles although the formation of cracks may be successfully prevented thereby.

The phosphating process described briefly above will hereinafter be described in detail.

Thus, for the purpose, a phosphoric acid or phosphate solution (hereinafter referred to as phosphating solution) is employed. The phosphating solution which can be profitably utilized on a commercial scale is a solution containing one or more members of the group consisting of phosphoric acid and the mono- and di-salts of phosphoric acid, such as $H_3PO_4$, $NH_4H_2PO_4$, $KH_2PO_4$, $(NH_4)_2HPO_4$, $Na_2HPO_4$, $NaH_2PO_4$, $K_2HPO$, etc. Among the above-mentioned compounds, a solution containing one or more of $H_3PO_4$, $NH_4H_2PO_4$, $NaH_2PO_4$ and $Na_2HPO_4$ is particularly preferred.

While the concentration of such a phosphating solution is optional, satisfactory results are obtained by the use of a solution containing a total of 3 to 100 grams of phosphoric acid and phosphates per 1,000 ml.

The duration of phosphating can be drastically reduced by adding 0.05 to 10 grams/l. of an oxidant to the above solution, the oxidant being selected from the group consisting, for example, of chromic acid, dichromic acid, chromates (e.g. sodium chromate, potassium chromate, etc.), dichromates (e.g. sodium dichromate, potassium dichromate); perchlorates (e.g. sodium perchlorate, potassium perchlorate, etc.), chlorates (e.g. sodium chlorate, potassium chlorate, etc.), nitric acid, nitrate (e.g. sodium nitrate, potassium nitrate, etc.), nitrites (e.g. sodium nitrite, potassium nitrite, etc.), and the like.

When a steel wire is immersed in the phosphating solution, a film of iron phosphate is formed on the surface of the steel. As has hereinbefore been pointed out, the steel wire having a surface film of iron phosphate is immune to cracking.

The duration of phosphating, as well as the temperature of the phosphating solution, is determined by the composition of the solution. Briefly, the higher the temperature of the phosphating solution, the less the duration of phosphating required. The optimal range of conditions, which can be advantageously adopted on a commercial scale, where an oxidant is added, is 45°–70° C. for 1 to 10 minutes.

Actually, however, in commercial operations, the wire to be phosphated usually has some oil or grease on the surface. Since the iron phosphate film described above forms a poor bond with the oily surface of the steel wire, it is preferable to clean the wire prior to the phosphating process.

For example, the oil and grease can be completely removed by dipping the steel wire in a bath containing 25 g./l. of sodium hydroxide, 50 g./l. of sodium carbonate and 10 g./l. of sodium triphosphate at 90° C. for 5 minutes, and then washing the wire with water.

The oil and grease can also be removed by washing the steel wire with trichlorethylene or perchlorethylene, for instance.

The steel wire which has undergone the above-mentioned steaming and phosphating treatments can be used as such in the production of reinforced glass. However, if there is some interval between the phosphating process and the sealing of the wire into the glass, the wire might rust and the rust in turn could result in bubbles.

Such disadvantage can be overcome by the following procedure. After the phosphating and, preferably, subsequent to washing with water, the wire is immersed in a solution (the concentration of which is about 0.2 to 2 g./l.) containing a member of the group consisting of chromic acid, dichromic acid, chromates (e.g. sodium chromate, potassium chromate, etc.) and dichromates (e.g. sodium dichromate, potassium dichromate, etc.).

It is presumed that the above chromium treatment is effective to prevent rusting because a chromium-containing film is formed on the wire. The beneficial effect of phosphating is not adversely affected by this treatment.

The above-mentioned steaming and phosphating processes are carried out in combination with the stretching operations.

While a number of different sequences are possible, the optimum combination or sequence of combinations will be described.

If the wire is stretched repeatedly after the steaming operation, the decarburized layer (containing no carbon or only a small amount of carbon) formed on the wire by the steaming is reduced in thickness, and the internal structure containing a relatively large amount of carbon tends to be exposed. This condition leads to the formation of bubbles. Therefore, the steaming operation should be delayed as much as possible in the overall process.

On the other hand, in the course of steaming, individual wires tend to stick together, and if these wires are then separated, they often sustain surface damages. The steaming of a wire may also result in the formation of scale on the wire. Wires having such surface defects are liable to give rise to cracks and bubbles.

Thus, it is preferable to conduct at least one cycle of stretching subsequent to the steaming operation.

The optimum combination of steaming and stretching is that the wire is stretched once or twice after the steaming.

The phosphating of the wire is preferably carried out after the wire has been woven into netting.

If stretching and weaving are conducted after the phosphating process, the iron phosphate film might be damaged and cracking might occur.

The steel wire treated in the above manner can be sealed into molten glass by any known method. The invention will hereinafter be described in further detail by way of the following examples.

EXAMPLES 1–15

A steel wire of 0.6 millimeter diameter was obtained by applying a 15-cycle stretching operation to a rod of 5.5 millimeters diameter. The wire was then steamed and subsequently stretched further to a diameter of 0.55 millimeter. A netting made of this wire was immersed in a bath containing 25 g./l. of NaOH, 30 g./l. Na$_3$PO$_4$ and 50 g./l. of sodium carbonate at 90° C. for 5 minutes. After washing with water, the wire was phosphated, and then sealed into molten glass.

The steaming conditions, the number of stretching cycles, phosphating conditions, the composition of steel and of glass, sealing temperature, and the magnitude of bubbling and of cracking are tabulated below. Nos. 11 and 12 correspond to Nos. 3 and 10, respectively, except that, in the former cases, no phosphating was carried out. Nos. 13 and 14 correspond to Nos. 3 and 6, except that, in the former cases, steaming was dispensed with. No. 15 represents the case in which the same wire as No. 4 was not treated at all.

| | Composition of steel | | | | | | Number of stretching cycles after steaming | Composition of glass | | | | | | | Searing temperature, (° C.) |
|---|---|---|---|---|---|---|---|---|---|---|---|---|---|---|---|
| | C | P | S | Mn | Cu | Si | | SiO$_2$ | Na$_2$O+K$_2$O | CaO | MgO | Al$_2$O$_3$ | Fe$_2$O$_3$ | SO$_4$ | |
| No. 1 | 0.06 | 0.03 | 0.02 | 0.56 | 0.20 | 0.33 | 1 | 72.2 | 15.0 | 6.92 | 4.01 | 1.66 | 0.12 | 0.22 | 1,160 |
| No. 2 | 0.10 | 0.028 | 0.02 | 0.75 | 0.16 | 0.31 | 1 | 72.4 | 14.6 | 6.88 | 3.89 | 1.68 | 0.33 | 0.14 | 1,158 |
| No. 3 | 0.06 | 0.031 | 0.026 | 0.54 | 0.23 | 0.21 | 1 | 72.2 | 15.0 | 6.92 | 4.01 | 1.66 | 0.12 | 0.22 | 1,160 |
| No. 4 | 0.08 | 0.03 | 0.026 | 0.46 | 0.21 | 0.43 | 1 | 72.5 | 13.4 | 11.2 | 0.97 | 1.42 | 0.08 | 0.25 | 1,160 |
| No. 5 | 0.17 | 0.034 | 0.019 | 0.37 | 0.29 | 0.13 | 2 | 72.4 | 14.6 | 6.88 | 3.89 | 1.68 | 0.33 | 0.14 | 1,158 |
| No. 6 | 0.18 | 0.027 | 0.037 | 0.49 | 0.24 | 0.04 | 1 | 72.4 | 15.0 | 6.92 | 4.01 | 1.66 | 0.12 | 0.22 | 1,160 |
| No. 7 | 0.13 | 0.032 | 0.031 | 0.45 | 0.27 | 0.28 | 3 | 72.5 | 13.4 | 11.2 | 0.97 | 1.42 | 0.08 | 0.25 | 1,160 |
| No. 8 | 0.22 | 0.035 | 0.029 | 0.61 | 0.31 | 0.32 | 1 | 72.5 | 14.6 | 6.88 | 3.89 | 1.68 | 0.33 | 0.14 | 1,157 |
| No. 9 | 0.14 | 0.03 | 0.03 | 0.70 | 0.23 | 0.22 | 1 | 72.5 | 13.4 | 11.2 | 0.97 | 1.42 | 0.08 | 0.25 | 1,157 |
| No. 10 | 0.13 | 0.032 | 0.031 | 0.45 | 0.27 | 0.28 | 1 | 72.4 | 14.6 | 6.88 | 3.89 | 1.68 | 0.33 | 0.14 | 1,160 |

| | Steaming conditions | | | | Phosphating conditions | | | | | | | | | |
|---|---|---|---|---|---|---|---|---|---|---|---|---|---|---|
| | Composition of gas (vol. percent) | | Dew point, ° C. | Heating temp. ° C. | Treating time, hrs. | Composition of phosphate, gr./l. | | | | | | | Temp. | Treating time, min. |
| | H$_2$ | N$_2$ | | | | NaH$_2$PO$_4$ | Na$_2$HPO$_4$ | NH$_4$H$_2$PO$_4$ | NaCl+O$_4$ | NaCl+O$_3$ | NaOH | H$_3$PO$_4$ | Na+NO$_2$ | | |
| No. 1 | 100 | | 19 | 560 | 3.5 | 15 | | | | | | 6.5 | | 70 | 5 |
| No. 2 | 75 | 25 | 19 | 620 | 2.0 | | 0.6 | 14 | 0.15 | | | | | 60 | 5 |
| No. 3 | 75 | 25 | 30 | 650 | 1.5 | | | | | | 10 | 90 | 5.0 | 60 | 5 |
| No. 4 | 3.5 | 96.5 | 40 | 650 | 2.0 | 15 | | | | | | 6.0 | | 70 | 3 |
| No. 5 | 100 | | 40 | 720 | 3.0 | | | 14 | 0.15 | | | | | 60 | 3 |
| No. 6 | 50 | 50 | 50 | 650 | 2.5 | 15 | | | | | | 3.5 | | 65 | 5 |
| No. 7 | 25 | 75 | 60 | 650 | 3.5 | | | 14 | 0.15 | | | | | 55 | 3 |
| No. 8 | 75 | 25 | 70 | 720 | 3.5 | 15 | | | | | | 8 | | 60 | 5 |
| No. 9 | 8.3 | 91.7 | 70 | 650 | 3.5 | | | 11 | | | | | | 60 | 5 |
| No. 10 | 20 | 80 | 60 | 650 | 2.5 | 15 | | | | | | 6.0 | | 50 | 2 |

| | Bubbling | Cracking, percent | | Bubbling | Cracking, percent | | Bubbling | Cracking, percent |
|---|---|---|---|---|---|---|---|---|
| No. 1 | Some bubbles | 0 | No. 6 | No bubbles | 0 | No. 11 | No bubbles | 0.6 |
| No. 2 | do | 0 | No. 7 | Very few bubbles | 0 | No. 12 | do | 4 |
| No. 3 | No bubbles | 0 | No. 8 | Some bubbles | 0 | No. 13 | Manny bubbles | 0 |
| No. 4 | Some bubbles | 0 | No. 9 | No bubbles | 0 | No. 14 | Very many bubbles | 0 |
| No. 5 | No bubbles | 0 | No. 10 | do | 0 | No. 15 | do | 4 |

NOTE.—Percent cracking means the length of a crack per unit length of steel wire, as expressed in percents.

EXAMPLE 16

Whereas the steel wires treated by the methods of Examples 1 to 10 rusted on standing in the atmosphere for 20 days, similar wires which were washed with water subsequent to phosphating, and then immersed in 0.05% solution of chromic acid or 0.02% solution of $K_2Cr_2O_7$ at 75° C. for 1 minute, did not rust under the same contions as above.

When the latter wires were sealed into glass, precisely the same results were had as those attained in Examples 1 to 10.

We claim:

1. A steel wire for use in glass reinforcement, wherein the steel contains, by weight, about 0.05 to about 0.2% carbon, less than about 0.035% phosphorus, less than about 0.04% sulfur, less than about 0.8% manganese, less than about 0.3% copper, and about 0.03 to about 0.4% silicon, said steel wire carrying a decarburized surface layer, and an iron phosphate film on said decarburized surface layer.

2. The method of producing a wire-reinforced glass, comprising the steps of decarburizing the surface of a steel wire by heat-treating the steel wire in a water vapor containing reducing atmosphere, forming an iron phosphate film on said decarburized surface of the wire by phosphating the wire with a solution of at least one phosphate selected from the group consisting of $H_3PO_4$, $$MH_2PO_4 \text{ and } M_2HPO_4,$$

M being selected from the group consisting of alkali metals and $NH_4$, and then sealing the wire into a body of molten glass.

3. The method of claim 2, wherein the solution also contains at least one member of the group consisting of nitric acid, nitrates, nitrites, chromic acid, dichromic acid, chromates, dichromates, chlorates and perchlorates.

4. The method of claim 2, wherein the phosphated steel wire is subjected to treatment with a solution of at least one member of the group consisting of chromic acid, dichromic acid, chromates and dichromates.

References Cited

UNITED STATES PATENTS

| | | | |
|---|---|---|---|
| 3,127,289 | 3/1964 | Beall | 148—16 |
| 2,455,331 | 11/1948 | Eckel et al. | 117—53 |
| 3,055,779 | 9/1962 | Chu et al. | 117—53 |
| 3,082,116 | 3/1963 | Halversen et al. | 117—53 X |
| 3,193,417 | 7/1965 | Kopchak | 117—129 X |

FOREIGN PATENTS

| | | | |
|---|---|---|---|
| 604,522 | 7/1948 | Great Britain | 148—16 |

OTHER REFERENCES

Turpin et al.: J. of Iron and Steel Institute, December 1967, pp. 1252–1260.

The Making Shaping and Treating of Steel, pub. by U.S. Steel, 7th ed., 1957, pp. 816 and 817.

RALPH S. KENDALL, Primary Examiner

U.S. Cl. X.R.

117—53; 148—31.5, 6.15 R